United States Patent [19]

Miller et al.

[11] Patent Number: 5,402,474
[45] Date of Patent: Mar. 28, 1995

[54] SYSTEM, DATA PROCESSING METHOD AND PROGRAM TO PROVIDE A PROGRAMMABLE INTERFACE BETWEEN A WORKSTATION AND AN ARCHIVE SERVER TO AUTOMATICALLY STORE TELEPHONE TRANSACTION INFORMATION

[75] Inventors: Steven K. Miller, Germantown; Frank E. Mandato, Damascus; Suresh K. Gursahaney, Gaithersburg, all of Md.

[73] Assignee: International Business Machines Corporation, Armonk, N.Y.

[21] Appl. No.: 226,231

[22] Filed: Apr. 11, 1994

Related U.S. Application Data

[63] Continuation of Ser. No. 846,657, Mar. 5, 1992, abandoned.

[51] Int. Cl.6 .................... H04M 11/00; H04M 3/50
[52] U.S. Cl. ...................... 379/93; 379/142; 379/201; 379/267; 379/308
[58] Field of Search .................... 379/92–96, 379/142, 201, 246, 247, 308, 265, 267, 67, 88, 89, 216, 112, 207

[56] References Cited

U.S. PATENT DOCUMENTS

| | | | |
|---|---|---|---|
| 3,989,899 | 11/1976 | Norwich | 379/96 |
| 4,320,256 | 3/1982 | Freeman | 379/92 |
| 4,406,925 | 9/1983 | Jordan et al. | 379/93 |
| 4,438,296 | 3/1984 | Smith | 379/92 |
| 4,451,700 | 5/1984 | Kempner et al. | 379/88 |
| 4,599,493 | 7/1986 | Cave | 379/92 |
| 4,797,911 | 1/1989 | Szlam et al. | 379/67 |
| 4,894,857 | 1/1990 | Szlam et al. | 379/67 |
| 5,001,710 | 3/1991 | Gawrys et al. | 379/93 |
| 5,036,535 | 7/1991 | Gechter et al. | 379/201 |
| 5,065,393 | 11/1991 | Sibbitt et al. | 379/92 |
| 5,097,528 | 3/1992 | Gursahaney et al. | 379/142 |
| 5,187,750 | 2/1993 | Behera | 395/600 |

Primary Examiner—Wing F. Chan
Attorney, Agent, or Firm—John D. Flynn; John E. Hoel

[57] ABSTRACT

A system, data processing method and program provide a programmable interface between a workstation and an archive server to automatically store information derived from a telephone transaction. The archive server stores a data base of records having a plurality of category fields for information derived from the telephone transaction. A host access table stored in a memory in the workstation, contains programmable commands. An interface program stored in the workstation memory executes the commands in the host access table, to perform interfacing functions between a host computer and the telephone network and to perform interfacing functions between the workstation and the archive server.

24 Claims, 6 Drawing Sheets

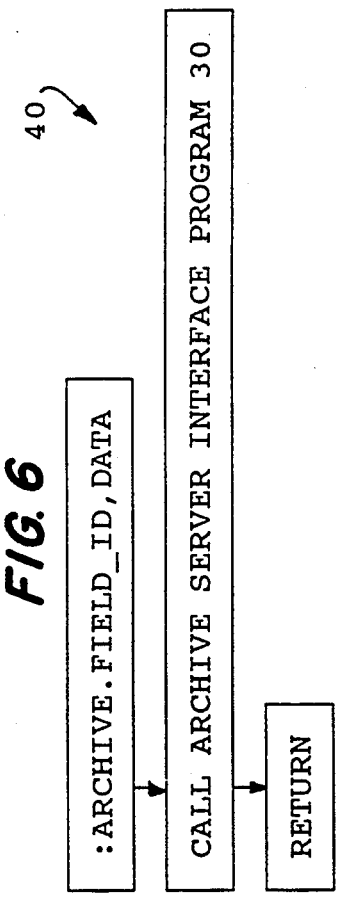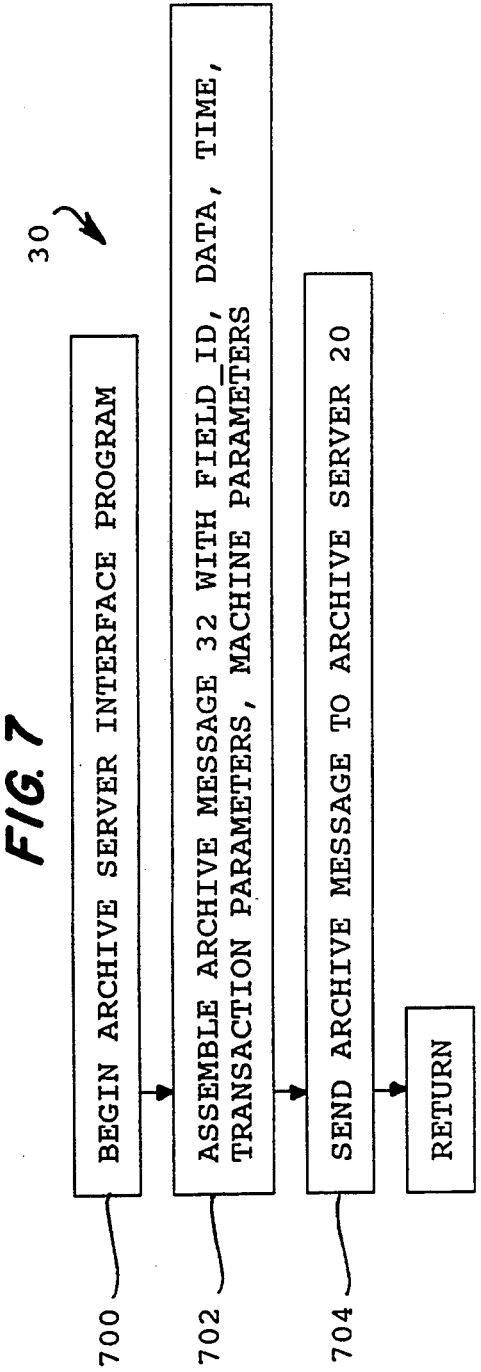

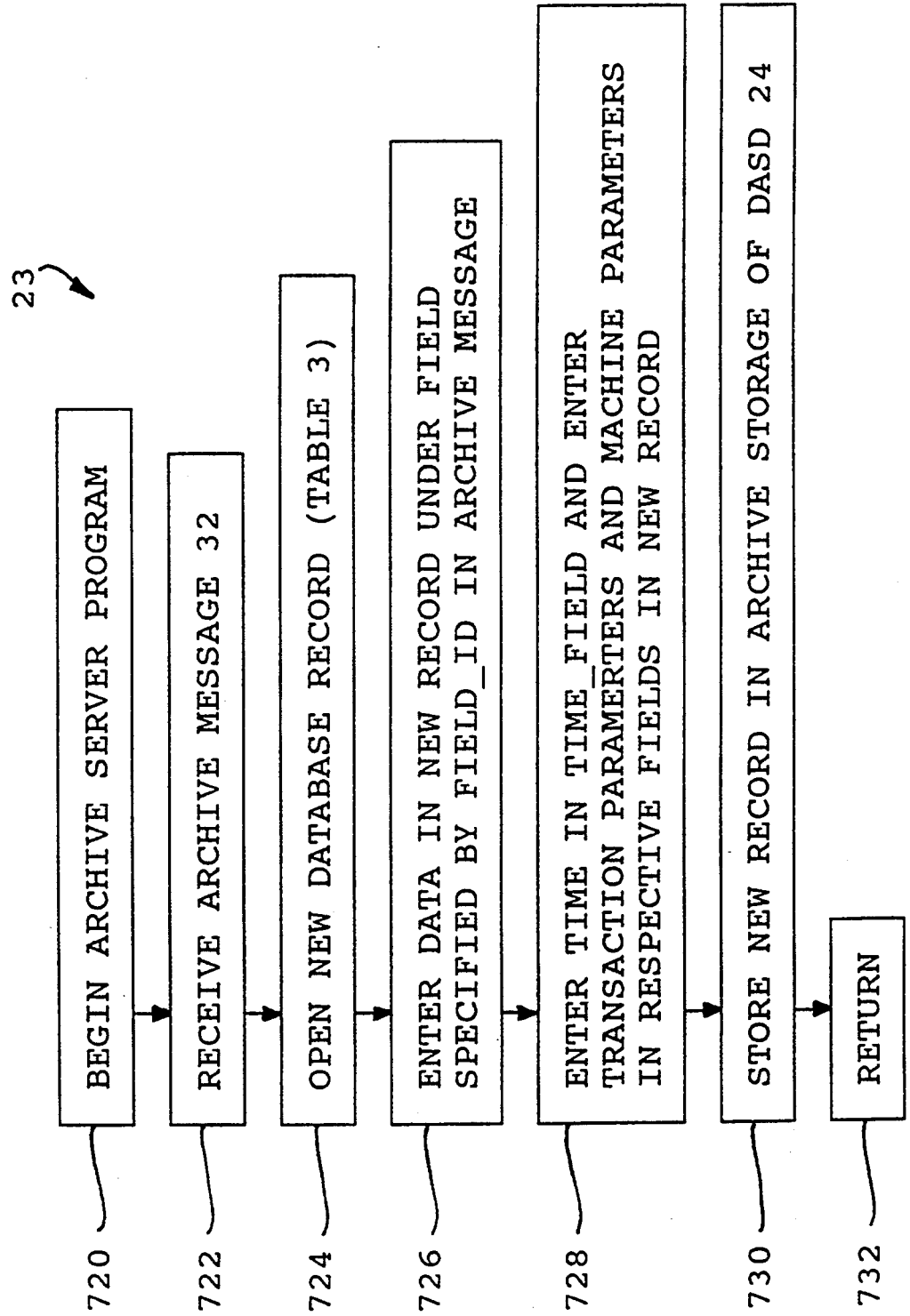

SYSTEM, DATA PROCESSING METHOD AND PROGRAM TO PROVIDE A PROGRAMMABLE INTERFACE BETWEEN A WORKSTATION AND AN ARCHIVE SERVER TO AUTOMATICALLY STORE TELEPHONE TRANSACTION INFORMATION

This application is a continuation of U.S. Ser. No. 07/846,657, filed 5 Mar. 1992, now abandoned entitled "A SYSTEM, DATA PROCESSING METHOD AND PROGRAM TO PROVIDE A PROGRAMMABLE INTERFACE BETWEEN A WORKSTATION AND AN ARCHIVE SERVER TO AUTOMATICALLY STORE TELEPHONE TRANSACTION INFORMATION", assigned to the same assignee as this patent application.

BACKGROUND OF THE INVENTION

1. Technical Field

The invention disclosed broadly relates to data processing systems and more particularly relates to the integration of telephony information in a data processing system.

2. Background Art

Today's competitive business environment has increased the importance of customer service. In many industries, the best company is determined by the service it provides its customers. In many cases, the primary interface the customer has with the company is the telephone. Depending on the business, the customer's calls are serviced by some type of call center in a telephone transaction. The call center can be a help desk, customer service, telephone sales or claims. Telephone transactions also take place in outbound calls initiated by the call center.

Recent advances in telephony technology have created an opportunity for improvements in call center operations. Until now, call center employees would answer the telephone and, based on information provided by the caller, access an application on a host computer. With these telephony advances, information about an incoming call is now provided by the Central Office to the company's private branch exchanges (PBX). This information about an incoming call can be used to automatically access host applications to obtain a customer profile during a telephone transaction.

What is needed is a flexible means for archiving the information derived from a telephone transaction. For either inbound calls or outbound calls, information is developed during the course of the telephone transaction relating to the business conducted during the transaction. Information can also be derived relating to the efficiency with which the transaction is conducted. Some means is needed for easily and flexibly storing such information automatically. This would enable compiling a data base of various categories of such archived information for transaction billing and call center management.

OBJECTS OF THE INVENTION

It is therefore an object of the invention to provide a flexible and automatic means for archiving telephone transaction data.

It is another object of the invention to provide a flexible and automatic technique for archiving telephone transaction information for inbound and outbound calls.

SUMMARY OF THE INVENTION

These and other objects, features and advantages are accomplished by the invention. A system, data processing method and program are disclosed to provide a programmable interface between a workstation and an archive server to automatically store information derived from a telephone transaction. The system includes a workstation coupled to a telephone network for obtaining a telephone number for either an inbound or outbound telephone call. A host computer is coupled to the workstation, for running an application program which exchanges menu images with the workstation, the menus containing fields for buffering operands to be processed by the host application program, the operands being derived from the telephone number.

In accordance with the invention, the system includes an archive server coupled to the workstation, for storing a database of records having a plurality of category fields for storing information derived from the telephone transaction. A host access table stored in a memory in the workstation, contains programmable commands. An interface program stored in the workstation memory executes the commands in the host access table, to perform interfacing functions between the workstation and the archive server, as well as to perform interfacing functions between the host application program and the telephone network.

The system includes a window partition in the workstation memory for buffering communicated menu images exchanged with the host computer. The window in the workstation memory receives a menu communicated from the host application program in the host computer, including response data which is responsive to the telephone number. A get data means in the interface program extracts the response data in the menu in the window, in response to a get command in the host access table.

In accordance with the invention, the system includes archive data means in the interface program for transmitting the extracted response data to the archive server for storage in a first one of the plurality of category fields, in response to an archive command in the host access table.

The system includes a keyboard coupled to the workstation for an agent to input transaction information received from the telephone network. In accordance with the invention, the system includes the archive data means transmitting the transaction information to the archive server for storage in a second one of the plurality of category fields, in response to a second archive command in the host access table.

In this manner, a programmable interface is provided between the workstation and the archive server to automatically store information derived from the telephone network, the host computer and/or the agent, during the telephone transaction.

BRIEF DESCRIPTION OF THE DRAWINGS

The invention can be better understood by referring to the accompanying figures.

FIG. 5 is a diagram showing the format of an archive message 32.

FIG. 6 is a flow diagram of the archive module 40.

FIG. 7 is a flow diagram of the archive server interface program 30.

FIG. 8 is a flow diagram of the archive server program 23.

DISCUSSION OF THE PREFERRED EMBODIMENT

The invention disclosed here is used in the system described in the co-pending U.S. patent application Ser. No. 07/660,763, filed Feb. 25, 1991, now U.S. Pat. No. 5,097,528, entitled "System for Integrating Telephony Data With Data Processing Systems," by S. K. Gursahaney, et al., assigned to the IBM Corporation and incorporated herein by reference. The Gursahaney, et al. patent application describes a programmable interface between a host-based application program and a telephone network to automatically transfer operands derived from caller identification data from the telephone network to the host application program.

Figure 1:
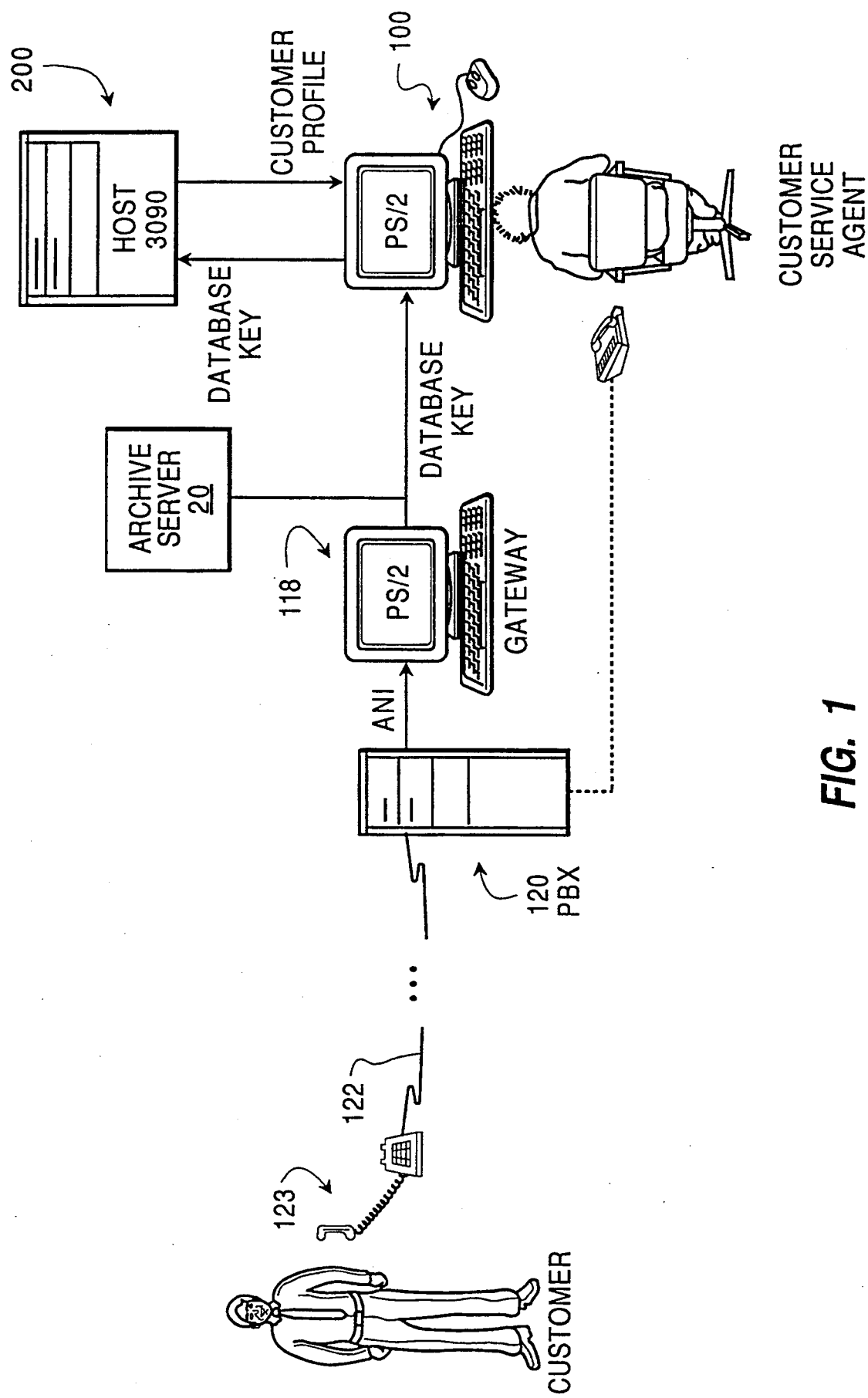
FIG. 1 is a block diagram of the system organization of the invention, including the archive server.

FIG. 1 shows an architectural diagram of the system described in the Gursahaney, et al. co-pending patent application, with the addition of the archive server invention 20. FIG. 1 shows an interactive, menu-driven programmable interface which is provided in the workstation 100 to enhance an existing telephone support system and an existing applications program in the host computer 200. The archive server invention 20 will archive telephone transaction information developed at the workstation 100. Archivable Data is obtained about the call from the telephone system 122, from the host computer 200, and from the customer service agent at the workstation 100. This data can include an automatic number identification (ANI), where the calling party's billing number is passed to the company's private branch exchange (PBX) 120 and gateway 118. This data can also include keyboard information entered by the customer service agent at workstation 100 while speaking on the telephone with the customer. Archivable data can also be telephone numbers which are provided by the host computer 200 to the workstation 100 for initiating call placement in outbound calling to the customer's telephone 123. Each of these sources of data can be automatically archived in the archive server 20 for future billing, auditing and management functions.

Figure 2:
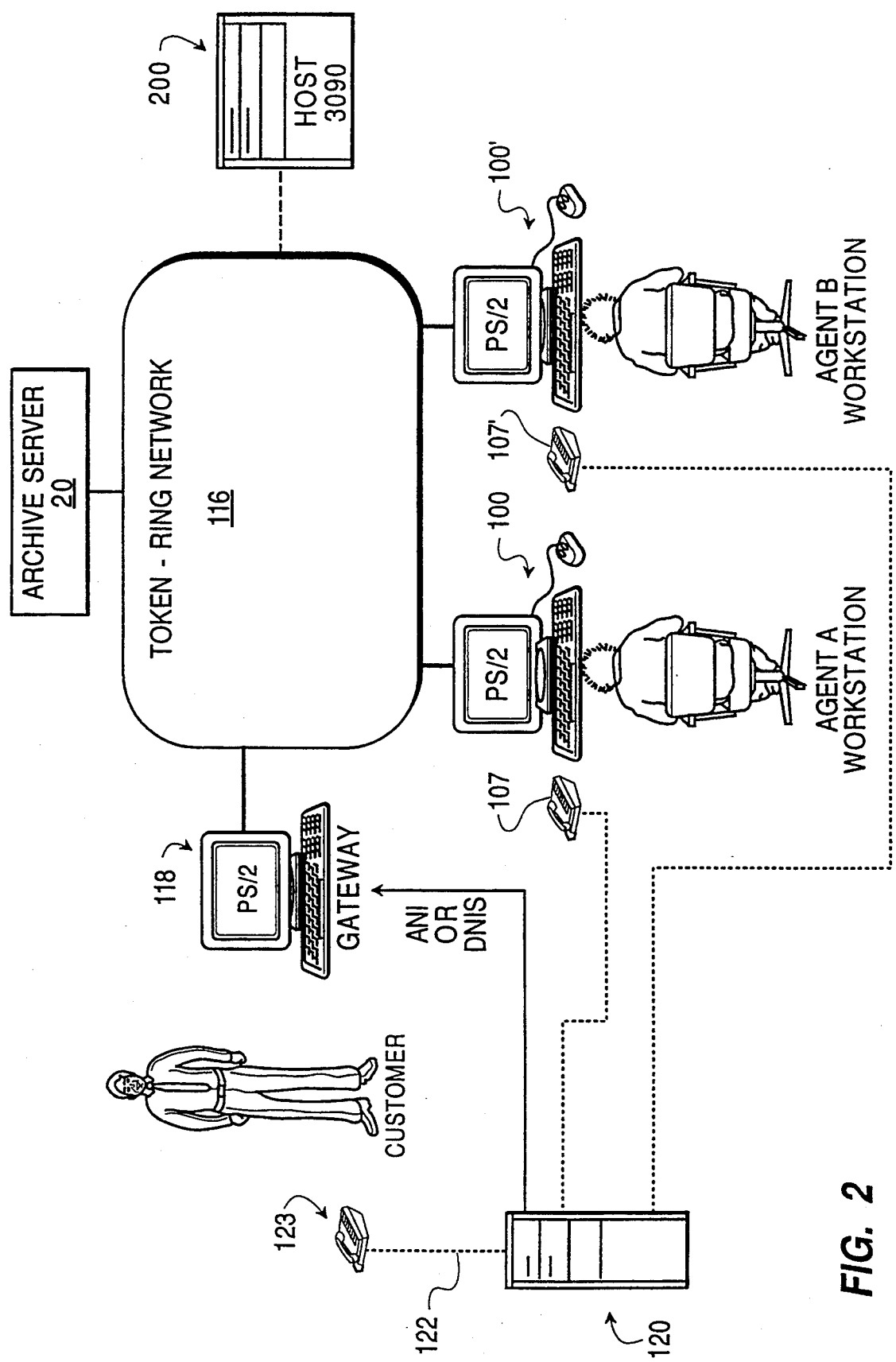
FIG. 2 is a functional block diagram of the invention when embodied using a token ring network with a plurality of workstations in a call center, including the archive server.

The system shown in FIG. 2 includes the gateway 118 and one or more workstation components 100 connected to a token ring local area network (LAN) 116. The organization of the system with several workstations 100 and 100' and the archive server 20, connected to the local area network 116 is shown in FIG. 2. The gateway 118 interfaces with the company's PBX 120 to obtain information on the incoming call, for example the ANI and passes that information via the token ring LAN 116 to a service representative's workstation 100. The workstation 100, under program control, automatically accesses host applications running on the host 200, to provide caller-specific information to the service representative. Alternatively, when call initiation is made in an outbound application, the host computer 200 will supply a telephone number to the workstation 100 for call initiation to the PBX 120, to place a call to the caller's telephone 123.

Figure 3:
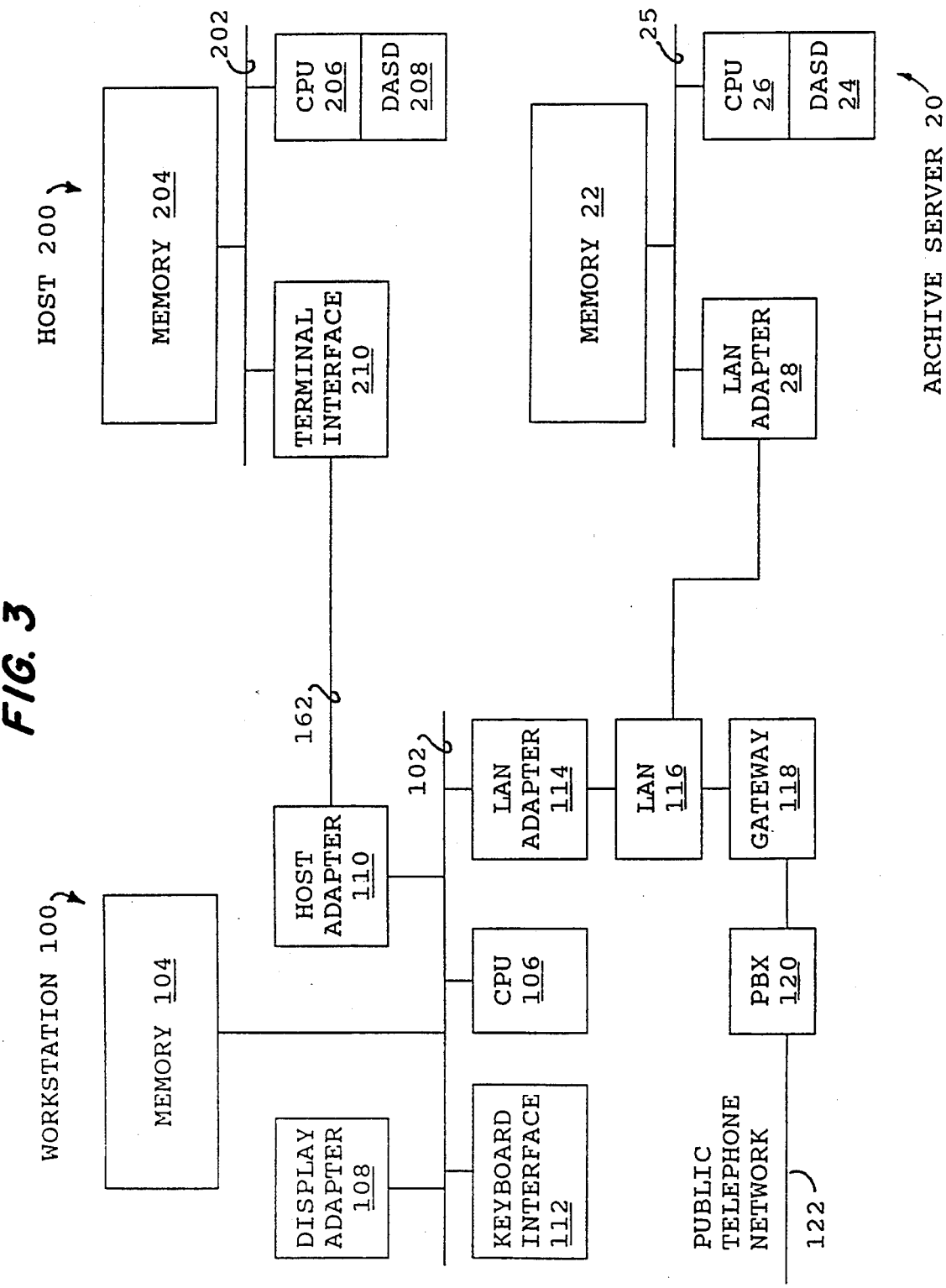
FIG. 3 is a system block diagram illustrating the relationship of the workstation 100, host 200, and archive server 20.

The workstation 100 provides functions such that the existing host applications running on the host 200 do not require modification. The workstation 100 further provides functions which enable the archiving of telephone transaction information to the archive server 20. The interconnection of the workstation 100, the host 200 and the archive server 20 is shown in FIG. 3. Workstation operations are controlled through the use of a host access table (HAT) 132 identified in the architectural diagram of FIG. 4. An example of the HAT 132 is shown in Table 1. The HAT is a file containing a series of commands that instruct the host interface program 138, also shown in FIG. 4, how to interact with the host application running on the host computer 200. The HAT is built by the call center's system administrator for use with a specific host application. The HAT can be personalized, so that each call center agent can customize operations to the specific types of calls handled by his workstation 100. Further, in accordance with the invention, the HAT 132 provides archiving commands to enable telephone transaction information to be automatically archived into the archive server 20.

The workstation 100 and the gateway 118 use IBM System Application Architecture (SAA) in an Operating System/2 Extended Edition (OS/2 EE) environment. Operating System/2, OS/2, and System Application Architecture are trademarks of the International Business Machines Corporation. The gateway 118 and the workstation 100 components employ the OS/2 Extended Edition Presentation Manager and they conform to the IBM SAA Customer User Access (CUA) guidelines.

The OS/2 EE Communications Manager Token Ring LAN NETBIOS Programming Interface is used to provide communications between the gateway 118 and the workstation 100 components and with the archive server 20. The gateway also uses the OS/2 EE Communications Manager X.25 Application Programming Interface (API) for communications with the PBX 120.

The archive server 20 uses the OS/2 EE Data Base Manager for maintaining the data base records, in accordance with the invention. The Data Base Manager is described in the IBM publication "OS/2 EE User's Guide," Vol. 3, order number S01F-0289, available from IBM branch offices.

The OS/2 EE Communications Manager is also used by the workstation 100 to permit host communications with the host 200. The host interface program 138 emulates keystrokes to access and retrieve data from the IBM System/370 Host Applications, AS/400 Host Applications and System 36 Applications, as may be running on the host 200. System/370, AS/400 and System 36 are trademarks of the International Business Machine Corporation.

Upon receiving data from the gateway 118 on an incoming call, the host interface program 138 uses this data to access customer information stored in the host data base on the host computer 200. This customer information is automatically displayed at the workstation 100 on or before the time that the telephone 107 at the workstation 100 actually rings. These workstation operations to access the host computer 200 are controlled through the use of the host access table (HAT) 132.

During the course of a telephone transaction between the customer service agent at the workstation 100 and the customer at the customer telephone 123, data is accumulated which should be archived in the archive server 20 for billing, auditing and system management functions. The archiving operations are also controlled by the host access table (HAT) 132.

A HAT 132 contains instructions or commands that specify the actions that are performed on the host session between the workstation 100, the host computer 200, and the archive server 20. For example, when a telephone call is received at a workstation telephone 107, the workstation receives the calling phone number from the gateway 118. A table in the workstation HAT 132 defines a procedure that passes this number to the host session on the host computer 200, enters the data in the proper field, and moves through the host application screens to the screen that contains the information the agent needs to display at the workstation 100. The customer service agent may then interview the customer over the telephone link to the customer's telephone 123, and the customer service agent will accumulate information which he will enter at the keyboard of the workstation 100. In accordance with the invention, the host access table 132 can specify information entered at the keyboard by the customer service agent 100, which is to be archived in the archive server. In addition, the host access table 132 may specify information received from the host computer 200, to transfer the archive server 20. Still further, the host access table 132 may specify information received from the PBX 120 for transmission to the archive server 20. In this manner, telephone transaction information can be automatically transmitted to the archive server 20, for archiving in a data base maintained in the archive server. Moreover, no modifications to the host applications running on the host computer 200 are required to perform this archiving operation.

Several host access tables 132 can be developed to access a variety of host applications running on the host computer 200, and a corresponding variety of telephone transaction archiving operations can be provided by the several host access tables 132 to archive transaction information in the archive server 20. An option is provided to the service agent to switch to an alternate HAT 132, dynamically.

The system provides pre-programmed key combinations called quick keys, to automate the functions at the workstation 100. The quick keys are key combinations that are used together to provide a shortcut in performing a task on the host computer 200, such as indicating the completion of data entry at the keyboard for the workstation 100. For example, if the caller wanted something ordered, the service agent might use one of the quick key combinations to perform an information management system set of operations running on the host computer 200.

The interaction between the workstation 100 and the host computer 200 is controlled by statements within the host access table HAT 132. This is described in detail in the co-pending patent application by Gursahaney, et al., referenced above.

Table 1 herein shows an example of a host access table 132 which incorporates the ARCHIVE command to archive telephone transaction information into the archive server 20. Reference to Table 1 will show that the example is an inbound telephone call from a customer who wishes to place an order with the customer service agent at the workstation 100. When the PBX 120 receives the call from the customer's telephone 123 over the network 122, an automatic number identification (ANI) message containing the caller's telephone number, is passed through the gateway 118 in FIG. 2 and over the LAN 116 to the agent's workstation 100. Receipt by the HAT 132 in the workstation 100 of the ANI information, begins execution of the HAT 132 in the workstation 100. The HAT 132 of Table 1 begins by initiating the ":SETSESSION.A" command which initiates a session with the host computer 200. Next, the ANI information, which is also equivalent to the customer number for the calling customer, is set equal to the variable "%1" by means of the PUT command ":PUT.7,38,%1" in Table 1. This is followed by the SENDKEY command ":SENDKEY.ENTER" in Table 1 which sends the customer number to the host computer 200. By a pre-programmed data base operation in the host computer 200, customer information such as the customer name, residence address, past purchase history, and credit card information, for example, is returned via the LAN 116 to the workstation 100 where it is displayed on the display screen. Reference to Table 1 will show that the ENDTABLE command ":ENDTABLE.SALES" momentarily halts the execution of the HAT 132 at the workstation 100, while the panel of information from the host 200 is displayed for the agent. The host will display the customer credit card number at a location 5,30 on the display screen on the workstation. The agent then conducts a conversation over the telephone 107 with the customer accumulating the purchase information that the customer provides indicating a catalog number for an item he wishes to purchase. The agent keys in the catalog number on the keyboard at workstation 100, which is displayed at a location 5,10 on the display screen at the workstation.

After the agent has closed the sale with a customer, the agent executes a quick key combination at the workstation 100. This is, for example, the key combination of the ALT key and the A key. The quick key combination will then renew the execution of the HAT 132 at the workstation 100, beginning at ":QUICKKEY.ALTA." The next command in the HAT of Table 1 to be executed is the GET command which gets the catalog number and sets it equal to the variable #1. Then the archive command ":ARCHIVE.1,#1" is executed which saves the catalog number of the item in field 1 of a new record shown in Table 3, which is to be archived in the archive server 20. An archive message 32, shown in FIG. 5, is transmitted to the archive server 20 to open a new record (Table 3) in the data base in the server 20 and to enter the catalog number of the item in field 1.

Then at the workstation 100, the HAT 132 executes the next GET command in Table 1 ":GET.5,30,16,#2" which gets the customer's credit card number from the panel being displayed at the workstation 100, the credit card number having been obtained from the host computer 200. The credit card number is set equal to the variable "#2." Then the second archive command ":ARCHIVE.2,#2," in Table 1 is executed which saves the credit card number in field 2 of the data base. This is done by sending an archive message 32 over LAN 116 to the archive server 20 which opens a second data base record shown in Table 4, and the credit card number is saved in field 2 of the second record.

Then at the workstation 100, the HAT 132 continues execution by executing a third archive command ":ARCHIVE.7, Manager is Smith," which can be seen in Table 1. This will automatically enter a comment that the manager's name is Smith, into a third record to be opened in the archive server 20 in field 7, as shown in Table 5.

Then at the workstation 100, the HAT 132 of Table 1 executes the command ":ENDQUICKKEY.ALTA" and this ends the portion of the HAT 132 which was commenced with actuating the quick keys "ALT" & "A" in Table 1.

The HAT table has been paused in its execution at this point. The agent at the workstation 100 can restart the execution of the HAT 132 by executing another quick key combination. If the agent at the workstation 100 wishes to record a message in the archive server 20 as to whether the customer was pleased or not at the conclusion of the telephone call session, the agent can actuate the quick key combination "ALT" & "P" to show that the customer was pleased. Alternately, the agent can actuate the quick key combination "ALT" & "N" to show that the customer was not pleased. If the quick key combination "ALT" & "P" is actuated, then as is seen in Table 1, the archive command ":ARCHIVE.8, Pleased customer" is executed, which sends an archive message 32 over LAN 116 to the archive server 20, to open a new record in the data base, shown in Table 6, which records in field 8 the comment "Pleased customer." Alternately, if the agent at workstation 100 had actuated the quick key combination "ALT" & "N," then Table 1 shows that the archive command ":ARCHIVE.8, Not pleased customer," is executed. This sends a message to the archive server 20 to open a new record in the data base and enter into field 8 of the record the comment, "Not pleased customer."

FIG. 3 illustrates an architectural diagram of the workstation 100 as it conducts a terminal session with the host 200 and performs archiving operations with the archive server 20. The workstation 100 includes the bus 102 which interconnects the memory 104, the CPU 106, the display adapter 108, the host adapter 110, the keyboard interface 112, and the local area network adapter 114. The workstation 100 can be an IBM PS/2 Model 80, for example. The LAN adapter 114 is connected through a LAN 116 to the archive server 20 and is also connected through the LAN 116 to the gateway 118 which in turn connects to a private branch exchange (PBX) 120 which is connected to the public telephone network 122.

Also included in the architectural diagram of FIG. 3 is the host computer 200 which includes a bus 202 which interconnects the memory 204, CPU 206, the DASD 208, and the terminal interface 210. The host computer 200 may be an IBM AS/400 computer, for example.

Also included in the architectural diagram of FIG. 3 is the archive server 20 which may be an IBM PS/2 Model 80, for example, which includes a 200 megabyte hard drive DASD 24. Resident on the hard drive DASD 24 of the archive server 20 is a data base management program such as the OS/2 EE Data Base Manager. Data base records are opened and data inserted into identified fields in the data base in accordance with standard operations performed by the OS/2 EE Data Base Manager.

Table 2 illustrates an example format of 32 fields which can be defined for records opened in the data base maintained by the archive server 20. Tables 3, 4, 5 and 6 are examples of data base records generated by the archive commands in the HAT 132 of Table 1.

Figure 4:
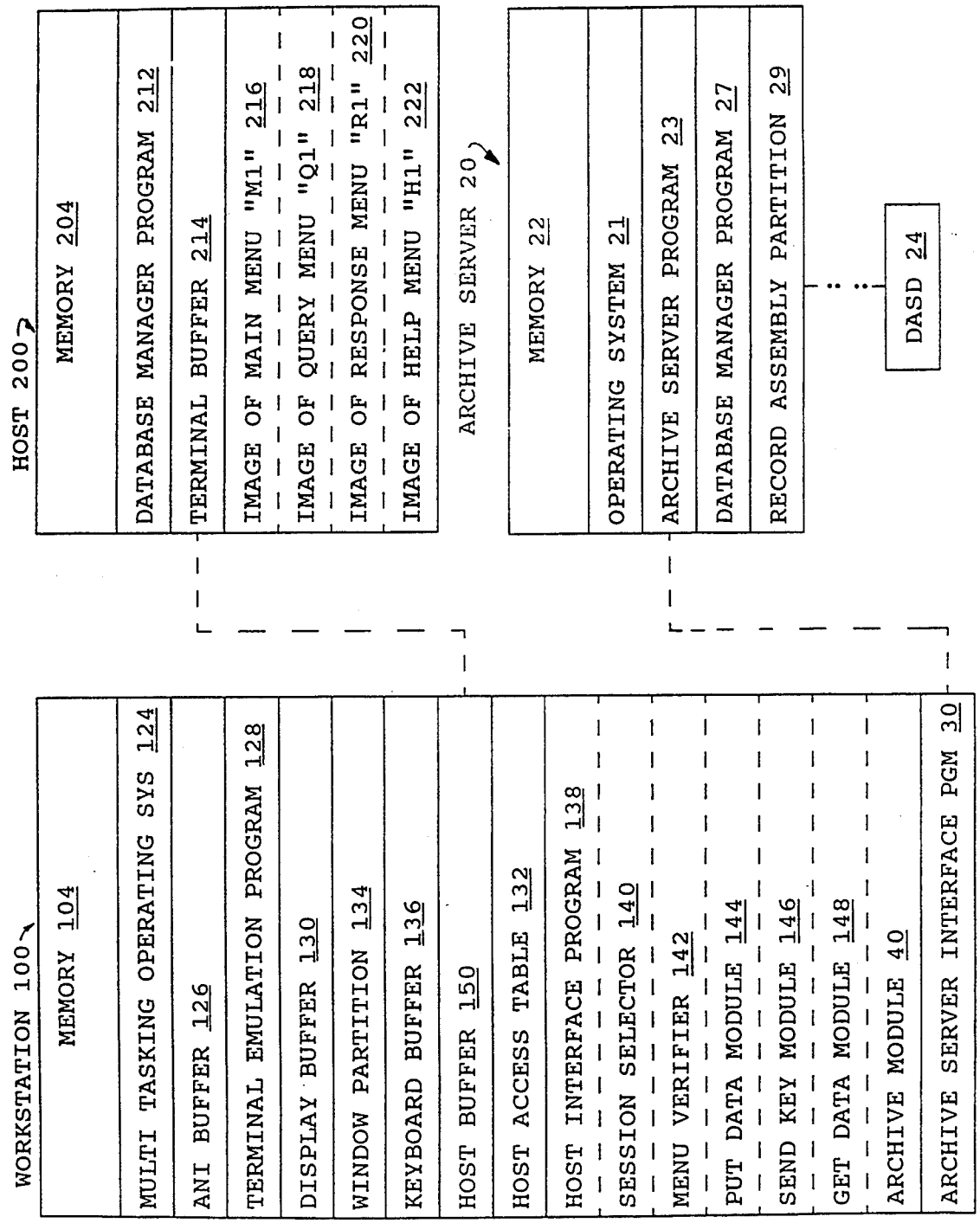
FIG. 4 is a diagram illustrating the contents of the memory 104 in the workstation 100, the memory 204 in the host 200, and the memory 22 in the archive server 20.

The memory 104 in the workstation 100 can have an automatic number identification buffer 126 shown in FIG. 4, which is dedicated to store ANI data received through the LAN adapter 114 from the PBX 120, which came from the public telephone network 122. The memory 104 can also have a host buffer 150 which is dedicated to receiving and transmitting data between the workstation 100 through the host adapter 110 and the terminal interface 210 to the host computer 200. The terminal buffer 214 in the memory 204 of host computer 200 is dedicated to sending and receiving data between the host 200 and the workstation 100.

The memory 104 in the workstation 100 has the archive server interface program 30 which sends and receives messages to and from the archive server 20 over the local area network 116.

FIG. 4 provides a detailed description of the organization of the memory 104 for the workstation 100. The memory 104 in the workstation 100 includes a multi-tasking operating system 124 which can be the OS/2 Extended Edition by IBM. The memory 104 also includes the ANI buffer 126.

The memory 104 also includes the terminal emulation program 128, which can be for example for the 3278/79 Emulation Control program by IBM. The 3270 data stream is designed for communications between a host computer and a "dumb terminal," such as the IBM 3278, characterized hereinafter as the 3270-type terminal. The path between the host computer and the 3270-type terminal is usually through a communications control unit, such as an IBM 3274. Host application programs which must interface with the 3270-type terminal transmit a screen's worth of display data to the terminal and receive back a screen's worth of display data from the terminal, without the requirement for the terminal performing sophisticated processing steps on the data, other than the alteration of fields within menus which are represented by the display data. The IBM 3278 can perform more efficient transfers by transmitting only those portions of the screen image which have changed. Additional information on the 3270-type terminal principle of operation and protocol can be found for example in the "3270 Information Display System Data Stream Program as Referenced," GA23-0059, "Introduction to the IBM 3270," GA27-2739, and "IBM 3270 for Description of Programmer's Guide," GA23-0061, published by the IBM Corporation and available through IBM branch offices. The terminal emulation program 128 manages a communications session with a host such as the host 200, by setting aside a window partition such as the window partition 134 in memory 104, in which a screen's worth of display data can be sent and received over line 162 with the terminal buffer 214 in the host in computer 200. The screen's worth of display data can be sent from panel images such as the images 216, 218, 220 and 222 in the memory 204 of the host 200 shown in FIG. 4.

The memory 104 in workstation 100 further includes a display buffer 130 and a keyboard buffer 136. In accordance with the invention, the memory 104 includes a host access table 132 which contains a sequence of user-defined commands to enable the workstation 100 to conduct terminal emulation sessions with the host computer 200 and which enables the automatic archiving of telephone transaction information by sending archiving messages 32 to the archive server 20, with the aid of the archive server interface program 30. The host interface program 138 in the memory 104 executes the commands set forth in the host access table 132, either by running as an integrated object program module with the host access table 132 at run time, or alternately, by performing the role of an interpreter program, interpreting the commands in the host access table 132. The host interface program 138 includes the session selector 140, the menu verifier 142, the put table module 144, the send-key module 146, the get data module 148, and the archive module 40. A flow diagram for the archive module 40 is shown in FIG. 6.

Further in accordance with the invention, the archive module 40 performs the message formulation operation in response to the ARCHIVE command, by calling the archive server interface program 30, whose flow diagram is shown in FIG. 7.

The ARCHIVE command is a command control word which can be used to transmit the value of a defined variable in an archive message 32, to the archive server 20 for storage in a record whose field is identified by the archive command. For example, the command ":ARCHIVE.1,#2" will cause the archive module 40 to call the archive server interface program 30, which will send an archive message 32 which takes the value of the variable "#2" and sends it via the LAN 116 to the archive server 20, for storage in a new record under the field number 1. Five examples of the archive command are given in Table 1, as has been described above.

The source of data which can be operated upon by the archive command and sent to the archive server 20 for insertion in a data base record, can be the keyboard at the workstation 100, data accessed from the host 200, or data obtained from the PBX 120.

In order to enable the ready access of data which has been archived in the records stored in the archive server 20, each time a record is opened in the archive server 20, certain standard information is stored in some of the fields of each record to relate the record to the particular telephone transaction being conducted. For example, the agent's identification can be entered into a corresponding field in a record. The time and date of the telephone transaction can be entered into a record, the type of transaction such as an incoming call, or an outgoing call can be entered, into the record. Then business-related information derived from the telephone call transaction can be entered such as the customer's telephone number, whether it is from an incoming call or an outgoing call, the customer's name, customer's address, background information on the customer, sales information developed during the course of the transaction, and agent comments can all be entered into one or more records which are opened in response to archive commands which are executed in the HAT 132.

The workstation memory shown in FIG. 4 includes the host interface program 138 which contains the archive module 40. The flow diagram for the archive module 40 is shown in FIG. 6. It is seen in the flow diagram of FIG. 6, that the archive module 40, in response to the occurrence of an archive command in the HAT 132, will call the archive server interface program 30, which is also resident in the memory 104 of the workstation 100.

The archive server interface program 30 in the memory 104 of the workstation 100, has its flow diagram shown in FIG. 7. In FIG. 7, step 700 begins the archive server interface program. Then in step 702, the archive message 32 is assembled with the field ID, data, time, transaction parameters, and machine parameters, such as is shown in the format diagram of FIG. 5. Then in step 704 of FIG. 7, the archive message 32 is sent to the archive server 20.

The diagram of FIG. 4 also illustrates the memory 22 for the archive server 20. Included in the memory 22 is the operating system 21, the archive server program 23, the Data Base Manager program 27, and the record assembly partition 29. The archive server program 23 is shown in the flow diagram of FIG. 8. Step 720 of the flow diagram of FIG. 8, begins the archive server program. Then in step 722, the archive message 32 is received at the archive server 20 from the LAN 116. Then in step 724, a new data base record is open. An example data base record is that shown in Table 3. Then in step 726, data is entered into the new record under the field specified by the field ID in the archive message 32. Then in step 728, the time is entered into the time field and transaction parameters are entered into the transaction parameter fields and the machine parameters are entered into the respective machine parameter fields in the new record. Then in step 730, the new record is stored in the archive storage maintained on the DASD 24. Then in step 732, the program returns to the main program in the host interface program 138.

At a later time, if billing information is desired to be compiled, the data base on the archive server 20 can be interrogated with appropriate query terms to compile billing records and invoices. Alternately, if auditing is desired to be performed, for example to audit the efficiency of the various agents handling calls in the call center, the data base on the archive server 20 can be interrogated using the appropriate query terms. Still further, if adjustments need to be made to the operating parameters of the system, appropriate query terms can be addressed to the data base in the archive server 20 to access appropriate machine parameters, to gather statistics on the operation of the call center system, for management purposes.

Table 7 shows an example data base report which can be compiled from archive server data base records, such as the records shown in Table 3. During the course of a business day, each of the agents will close many sales transactions in the call center. Table 7 represents an example of a data base report which can be compiled at the end of a business day, showing for each agent, the number of units of each catalog item sold. A query term can be formulated for each "AGENT" name field ANDed with the field "1_CATALOG_NO," resulting in accumulating the quantity of each catalog item sold by each respective agent. Table 7 is a resulting data base report for such a query of the archive server data base, listing the catalog number items for field #1 for those data base records archived for agent Jones. Such a report can also include unit prices for the catalog items and the arithmetic sum of total sales for each catalog item sold by agent Jones.

The resulting invention provides an improved programmable interface between a workstation and an archive server to automatically store information derived from a telephone transaction.

Although a specific embodiment of the invention has been disclosed, it will be understood by those having skill in the art that changes can be made to that specific embodiment without departing from the spirit and the scope of the invention.

TABLE 1

```
:TABLE.Sales,HAT for ABC
.*HAT for ABC
:SETSESSION.A
.* %1=ANI(CUSTOMER #)
:PUT.7,38,%1
:SENDKEY.ENTER
:ENDTABLE.Sales
.* Host displays customer credit card number at 5,30
.* Agent conducts conversation and keys in catalog number at 5,10
.*QUICKKEY to enter archive data
.*
:QUICKKEY.ALTA
.* Get catalog number
:GET.5,10,10,#1
.* This archive command saves the catalog number of the item in
   field 1
:ARCHIVE.1,#1
.* Get Customer credit card number
:GET.5,30,16,#2
.* This archive command saves the credit card number in field 2
   of data base
:ARCHIVE.2,#2
.* Enter comment about manager name
:ARCHIVE.7,Manager is Smith
:ENDQUICKKEY.ALTA
.* Quickkey that customer is pleased
:QUICKKEY.ALTP
:ARCHIVE.8,Pleased Customer
:ENDQUICKKEY.ALTP
.* Quickkey that customer is not pleased
:QUICKKEY.ALTN
:ARCHIVE.8,Not pleased customer.
:ENDQUICKKEY.ALTN
```

TABLE 2

TABLE-USERID.TELEPHONY
\*\*\*\*\*\*COLUMNS\*\*\*\*\*\*

| Column Name | Type | Length | Attributes |
|---|---|---|---|
| ACTION | Character (Variable) | 32 | Text |
| ANI | Character (Variable) | 32 | Text |
| DNIS | Character (Variable) | 32 | Text |
| TIME_FIELD | Character (Variable) | 32 | Text |
| DATE_FIELD | Character (Variable) | 32 | Text |
| AGENT | Character (Variable) | 32 | Text |
| CONNECT_ID | Character (Variable) | 32 | Text |
| XFR_TO_AGENT | Character (Variable) | 32 | Text |
| MACHINE_FIELD_1 | Character (Variable) | 32 | Text |
| MACHINE_FIELD_2 | Character (Variable) | 32 | Text |
| MACHINE_FIELD_3 | Character (Variable) | 32 | Text |
| MACHINE_FIELD_4 | Character (Variable) | 32 | Text |
| MACHINE_FIELD_5 | Character (Variable) | 32 | Text |
| MACHINE_FIELD_6 | Character (Variable) | 32 | Text |
| MACHINE_FIELD_7 | Character (Variable) | 32 | Text |
| MACHINE_FIELD_8 | Character (Variable) | 32 | Text |
| MACHINE_FIELD_9 | Character (Variable) | 32 | Text |
| MACHINE_FIELD_10 | Character (Variable) | 32 | Text |
| USER_DEFINED1 | Character (Variable) | 80 | Text |
| USER_DEFINED2 | Character (Variable) | 80 | Text |
| USER_DEFINED3 | Character (Variable) | 80 | Text |
| USER_DEFINED4 | Character (Variable) | 80 | Text |
| USER_DEFINED5 | Character (Variable) | 80 | Text |
| USER_DEFINED6 | Character (Variable) | 80 | Text |
| USER_DEFINED7 | Character (Variable) | 80 | Text |
| USER_DEFINED8 | Character (Variable) | 80 | Text |
| USER_DEFINED9 | Character (Variable) | 80 | Text |
| USER_DEFINED10 | Character (Variable) | 80 | Text |

\*\*\*\*\*\*INDEXES\*\*\*\*\*\*
Index Name:
Duplicates Allowed:
Column Name    Order
\*\*\*\*\*\*PRIMARY KEY\*\*\*\*\*\*
Index Name:
Column Name    Order
\*\*\*\*\*\*FOREIGN KEYS\*\*\*\*\*\*
Foreign Key Name:

TABLE 2-continued

Parent table name . .
Delete Rule . . . . .

TABLE 3

ARCHIVE.1,#1
ARCHIVE SERVER DATA BASE RECORD

| FIELD | DATA |
|---|---|
| ACTION | INBOUND_CALL |
| ANI | (301)765-1216 |
| DNIS | 5110 |
| TIME_FIELD | 09:32:01 |
| DATE_FIELD | 92-02-22 |
| AGENT | JONES |
| CONNECT_ID | 100 |
| XFR_TO_AGENT | -- |
| MACHINE_FIELD_1 | 9A12 |
| : | |
| : | |
| MACHINE_FIELD_10 | -- |
| 1_CATALOG_NO | GARDEN_0123 |
| 2_CREDIT_CARD_NO | |
| : | |
| : | |
| 7_MANAGER_NAME | |
| 8_CUSTOMER_COMMENT | |
| 9_-- | -- |
| 10_-- | -- |

TABLE 4

ARCHIVE.2,#2
ARCHIVE SERVER DATA BASE RECORD

| FIELD | DATA |
|---|---|
| ACTION | INBOUND_CALL |
| ANI | (301)765-1216 |
| DNIS | 5110 |
| TIME_FIELD | 09:32:15 |
| DATE_FIELD | 92-02-22 |
| AGENT | JONES |
| CONNECT_ID | 100 |
| XFR_TO_AGENT | -- |
| MACHINE_FIELD_1 | 0A12 |
| : | |
| : | |
| MACHINE_FIELD_10 | -- |
| 1_CATALOG_NO | |
| 2_CREDIT_CARD_NO | VISA_013-225-8X84-1209_0992 |
| : | |
| : | |
| 7_MANAGER_NAME | |
| 8_CUSTOMER_COMMENT | |
| 9_-- | -- |
| 10_-- | -- |

TABLE 5

ARCHIVE.7,Manager is Smith
ARCHIVE SERVER DATA BASE RECORD

| FIELD | DATA |
|---|---|
| ACTION | INBOUND_CALL |
| ANI | (301)765-1216 |
| DNIS | 5110 |
| TIME_FIELD | 09:32:30 |
| DATE_FIELD | 92-02-22 |
| AGENT | JONES |
| CONNECT_ID | 100 |
| XFR_TO_AGENT | -- |
| MACHINE_FIELD_1 | 0A12 |
| : | |
| : | |
| MACHINE_FIELD_10 | -- |

TABLE 5-continued

ARCHIVE.7,Manager is Smith
ARCHIVE SERVER DATA BASE RECORD

| FIELD | DATA |
|---|---|
| 1_CATALOG_NO | |
| 2_CREDIT_CARD_NO | |
| : | |
| : | |
| 7_MANAGER_NAME | Manager is Smith |
| 8_CUSTOMER_COMMENT | |
| 9_-- | -- |
| 10_-- | -- |

TABLE 6

ARCHIVE.8,Please Customer
ARCHIVE SERVER DATA BASE RECORD

| FIELD | DATA |
|---|---|
| ACTION | INBOUND_CALL |
| ANI | (301)765-1216 |
| DNIS | 5110 |
| TIME_FIELD | 09:32:45 |
| DATE_FIELD | 92-02-22 |
| AGENT | JONES |
| CONNECT_ID | 100 |
| XFR_TO_AGENT | -- |
| MACHINE_FIELD_1 | 0A12 |
| : | |
| : | |
| MACHINE_FIELD_10 | |
| 1_CATALOG_NO | |
| 2_CREDIT_CARD_NO | |
| : | |
| : | |
| 7_MANAGER_NAME | |
| 8_CUSTOMER_COMMENT | Pleased Customer |
| 9_-- | -- |
| 10_-- | -- |

TABLE 7

Data Base Report Example
ARCHIVE SERVER DATA BASE REPORT
For each agent, report number of units for each catalog item sold:
AGENT JONES

| 1_CATALOG_NO | QUANTITY | UNIT PRICE | TOTAL SALES |
|---|---|---|---|
| AUTOMO_0133 | 10 | $12.00 | $120.00 |
| AUTOMO_0145 | 13 | $100.00 | $1300.00 |
| : | | | |
| GARDEN_0094 | 29 | $50.00 | $1450.00 |
| GARDEN_0123 | 10 | $3.00 | $30.00 |
| GARDEN_0150 | 03 | $200.00 | $600.00 |
| : | | | |
| HARDWR_1722 | 01 | $100.00 | $100.00 |
| HARDWR_1750 | 35 | $20.00 | $700.00 |

What is claimed is:

1. A system, comprising:

a workstation coupled to a telephone network for receiving call identification data for a telephone transaction;

a host computer coupled to said workstation, for running an application program which exchanges menu images with said workstation, said menus containing fields for buffering operands to be processed by said host application program, said operands derived from said call identification data;

an archive server coupled to said workstation, for storing a data base of records having a plurality of category fields for storing information derived from said telephone transaction;

a host access table stored in a memory in the workstation, containing programmable commands, including an archive command, where each archive command specifies one of said plurality of category fields and said information derived from said telephone transaction;

an interface program stored in said workstation memory which executes said commands in said host access table, to perform interfacing functions between the host application program and the telephone network and to perform interfacing functions between said workstation and said archive server;

a window partition in said workstation memory for buffering a first menu image exchanged with said host application program;

said first menu image including response data in a location in said first menu which is responsive to said operand derived from said call identification data;

get data means in said interface program for extracting said response data at said location in said first menu in said window, in response to a get command in said host access table;

archive data means in said interface program for transmitting said extracted response data to said archive server for storage in a first one of said plurality of category fields specified by said archive command, in response to said archive command in said host access table;

whereby, a programmable interface is provided between the workstation and the archive server to automatically store information derived from said telephone transaction.

2. The system of claim 1 which further comprises:
said archive data means transmitting automatic number identification (ANI) information to a second one of said plurality of category fields, in response to an archive command in said host access table.

3. The system of claim 1 which further comprises:
said archive data means transmitting dialed number identification service (DNIS) information to a second one of said plurality of category fields, in response to an archive command in said host access table.

4. The system of claim 1 which further comprises:
said archive data means transmitting time information to a second one of said plurality of category fields, in response to an archive command in said host access table.

5. The system of claim 1 which further comprises:
said archive data means transmitting workstation agent information to a second one of said plurality of category fields, in response to an archive command in said host access table.

6. The system of claim 5 further comprising:
a database compilation means stored in the memory of the archive server for producing an auditing report from said stored data base of records, said database compilation means using said workstation agent information to provide an indication of agent efficiency.

7. The system of claim 1 which further comprises:
said archive data means transmitting telephone transaction type information to a second one of said plurality of category fields, in response to an archive command in said host access table.

8. The system of claim 1 further comprising:
a database compilation means for producing an auditing report from said stored data base of records.

9. The system of claim 1 further comprising:
a database compilation means for producing a billing report from said stored data base of records.

10. The system of claim 1 further comprising:
a database compilation means for producing a report having statistics on the operation of the system.

11. The system of claim 1 wherein said archive server is coupled to the workstation by a token ring local area network.

12. A system, comprising:
a workstation coupled to a telephone network for outputting a telephone number to place a telephone call for a telephone transaction;
a host computer coupled to said workstation, for running an application program which exchanges menu images with said workstation, said menus containing fields for buffering operands to be processed by said host application program, said operands derived from said telephone number;
an archive server coupled to said workstation, for storing a data base of records having a plurality of category fields for storing information derived from said telephone transaction;
a host access table stored in a memory in the workstation, containing programmable commands, including first and second archive commands;
an interface program stored in said workstation memory which executes said commands in said host access table, to perform interfacing functions between the host application program and the telephone network and to perform interfacing functions between said workstation and said archive server;
a window partition in said workstation memory for buffering a first menu image exchanged with said host application program;
said first menu image, including response data in a location in said first menu which is responsive to said operand derived from said telephone number;
get data means in said interface program for extracting said response data at said location in said first menu in said window, in response to a get command in said host access table;
archive data means in said interface program for transmitting said extracted response data to said archive server for storage in a first one of said plurality of category fields, in response to said first archive command in said host access table;
a keyboard coupled to said workstation for inputting transaction information by an agent;
said archive data means transmitting said transaction information to said archive server for storage in a second one of said plurality of category fields, in response to said second archive command in said host access table;
whereby, a programmable interface is provided between the workstation and the archive server to automatically store information derived from said telephone transaction.

13. A data processing method, comprising the steps of:
receiving call identification data for a telephone transaction in a workstation coupled to a telephone network;
running an application program in a host computer coupled to said workstation, which exchanges menu images with said workstation, said menus containing fields for buffering operands to be processed by said host application program, said operands derived from said call identification data;
storing a data base of records in an archive server coupled to said workstation, having a plurality of category fields for storing information derived from said telephone transaction;
storing a host access table in a memory in the workstation, containing programmable commands, including an archive command;
storing an interface program in said workstation memory which executes said commands in said host access table, to perform interfacing functions between the host application program and the telephone network and to perform interfacing functions between said workstation and said archive server;
buffering in a window partition in said workstation memory, a first menu image exchanged with said host application program;
said first menu including response data in a location in said first menu which is responsive to said operand derived from said call identification data;
executing a get data instruction in said interface program for extracting said response data at said location in said first menu in said, in response to a get command in said host access table;
transmitting said extracted response data to said archive server for storage in a first one of said plurality of category fields, in response to said archive command in said host access table;
whereby, a programmable interface is provided between the workstation and the archive server to automatically store information derived from said telephone transaction.

14. The method of claim 13 which further comprises:
transmitting automatic number identification (ANI) information to a second one of said plurality of category fields, in response to an archive command in said host access table.

15. The method of claim 13 which further comprises:
transmitting dialed number identification service (DNIS) information to a second one of said plurality of category fields, in response to an archive command in said host access table.

16. The method of claim 13 which further comprises:
transmitting time information to a second one of said plurality of category fields, in response to an archive command in said host access table.

17. The method of claim 13 which further comprises:
transmitting workstation agent information to a second one of said plurality of category fields, in response to an archive command in said host access table.

18. The method of claim 13 which further comprises:
transmitting telephone transaction type information to a second one of said plurality of category fields, in response to an archive command in said host access table.

19. A data processing program which, when executed in a data processing system, performs a method, comprising:

receiving call identification data for a telephone transaction in a workstation coupled to a telephone network;

running an application program in a host computer coupled to said workstation, which exchanges menu images with said workstation, said menus containing fields for buffering operands to be processed by said host application program, said operands derived from said call identification data;

storing a data base of records in an archive server coupled to said workstation, having a plurality of category fields for storing information derived from said telephone transaction;

storing a host access table in a memory in the workstation, containing programmable commands, including an archive command;

storing an interface program in said workstation memory which executes said commands in said host access table, to perform interfacing functions between the host application program and the telephone network and to perform interfacing functions between said workstation and said archive server;

buffering in a window partition in said workstation memory, a first menu image exchanged with said host application program;

said first menu including response data in a location in said first menu which is responsive to said operand derived from said call identification data;

executing a get data instruction in said interface program for extracting said response data at said location in said first menu in said, in response to a get command in said host access table;

transmitting said extracted response data to said archive server for storage in a first one of said plurality of category fields, in response to said archive command in said host access table;

whereby, a programmable interface is provided between the workstation and the archive server to automatically store information derived from said telephone transaction.

20. A system, comprising:

a workstation coupled to a telephone network for receiving call identification data for a telephone transaction;

a host computer coupled to said workstation, for running an application program which exchanges menu images with said workstation, said menus containing fields for buffering operands to be processed by said host application program, said operands derived from said call identification data;

an archive server coupled to said workstation, for storing a data base of records having a plurality of category fields for storing information derived from said telephone transaction;

a host access table stored in a memory in the workstation, containing programmable commands, including first and second archive commands, where each archive command specifies one of said plurality of category fields and said information derived from said telephone transaction;

an interface program stored in said workstation memory which executes said commands in said host access table, to perform interfacing functions between the host application program and the telephone network and to perform interfacing functions between said workstation and said archive server;

a window partition in said workstation memory for buffering a first menu image exchanged with said host application program;

said first menu image, including response data in a location in said first menu which is responsive to said operand derived from said call identification data;

get data means in said interface program for extracting said response data at said location in said first menu in said window, in response to a get command in said host access table;

archive data means in said interface program for transmitting said extracted response data to said archive server for storage in a first one of said plurality of category fields specified by said first archive command, in response to said first archive command in said host access table;

a keyboard coupled to said workstation for entering transaction information by an agent;

said archive data means transmitting said transaction information to said archive server for storage in a second one of said plurality of category fields specified by said second archive command, in response to said second archive command in said host access table;

whereby, a programmable interface is provided between the workstation and the archive server to automatically store information derived from said telephone transaction.

21. A system, comprising:

a workstation coupled to a telephone network for outputting a telephone number to place a telephone call for a telephone transaction;

a host computer coupled to said workstation, for running an application program which exchanges menu images with said workstation, said menus containing fields for buffering operands to be processed by said host application program, said operands derived from said telephone number;

an archive server coupled to said workstation, for storing a data base of records having a plurality of category fields for storing information derived from said telephone transaction;

a host access table stored in a memory in the workstation, containing programmable commands, including an archive command, where each archive command specifies one of said plurality of category fields and said information derived from said telephone transaction;

an interface program stored in said workstation memory which executes said commands in said host access table, to perform interfacing functions between the host application program and the telephone network and to perform interfacing functions between said workstation and said archive server;

a window partition in said workstation memory for buffering a first menu image exchanged with said host application program;

said first menu image, including response data in a location in said first menu which is responsive to said operand derived from said telephone number;

get data means in said interface program for extracting said response data at said location in said first menu in said window, in response to a get command in said host access table;

archive data means in said interface program for transmitting said extracted response data to said archive server for storage in a first one of said plurality of category fields specified by said archive command, in response to said archive command in said host access table;

whereby, a programmable interface is provided between the workstation and the archive server to automatically store information derived from said telephone transaction.

22. The system of claim 21 which further comprises: said archive data means transmitting time information to a second one of said plurality of category fields, in response to an archive command in said host access table.

23. The system of claim 21 which further comprises: said archive data means transmitting workstation agent information to a second one of said plurality of category fields, in response to an archive command in said host access table.

24. The system of claim 21 which further comprises: said archive data means transmitting telephone transaction type information to a second one of said plurality of category fields, in response to an archive command in said host access table.

* * * * *